No. 693,929. Patented Feb. 25, 1902.
C. B. VAN HORN.
VEHICLE WHEEL.
(Application filed Feb. 9, 1900. Renewed July 29, 1901.)
(No Model.) 2 Sheets—Sheet 2.
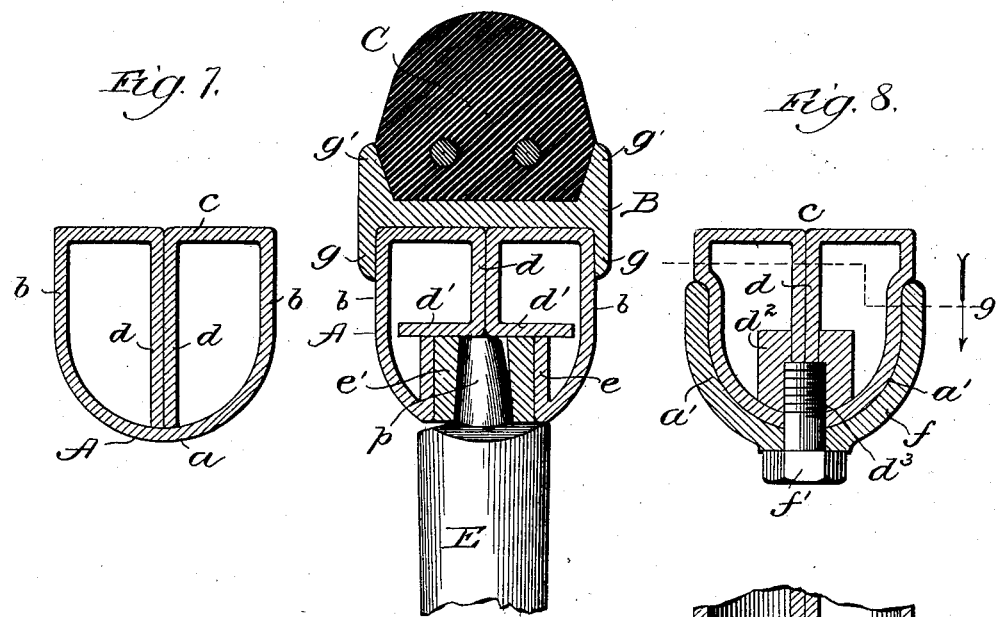
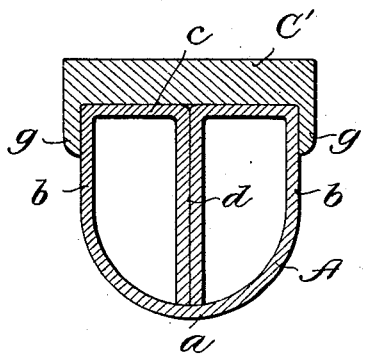
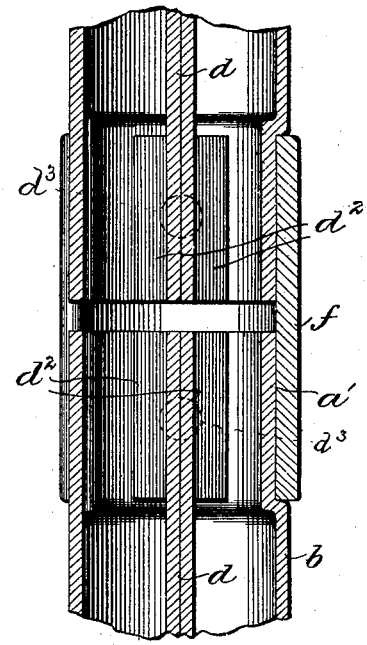
Witnesses:
Chas. E. Gaylord,
John Enders Jr.
Inventor:
Charles B. Van Horn,
By Dyrenforth, Dyrenforth & Lee,
Attys.

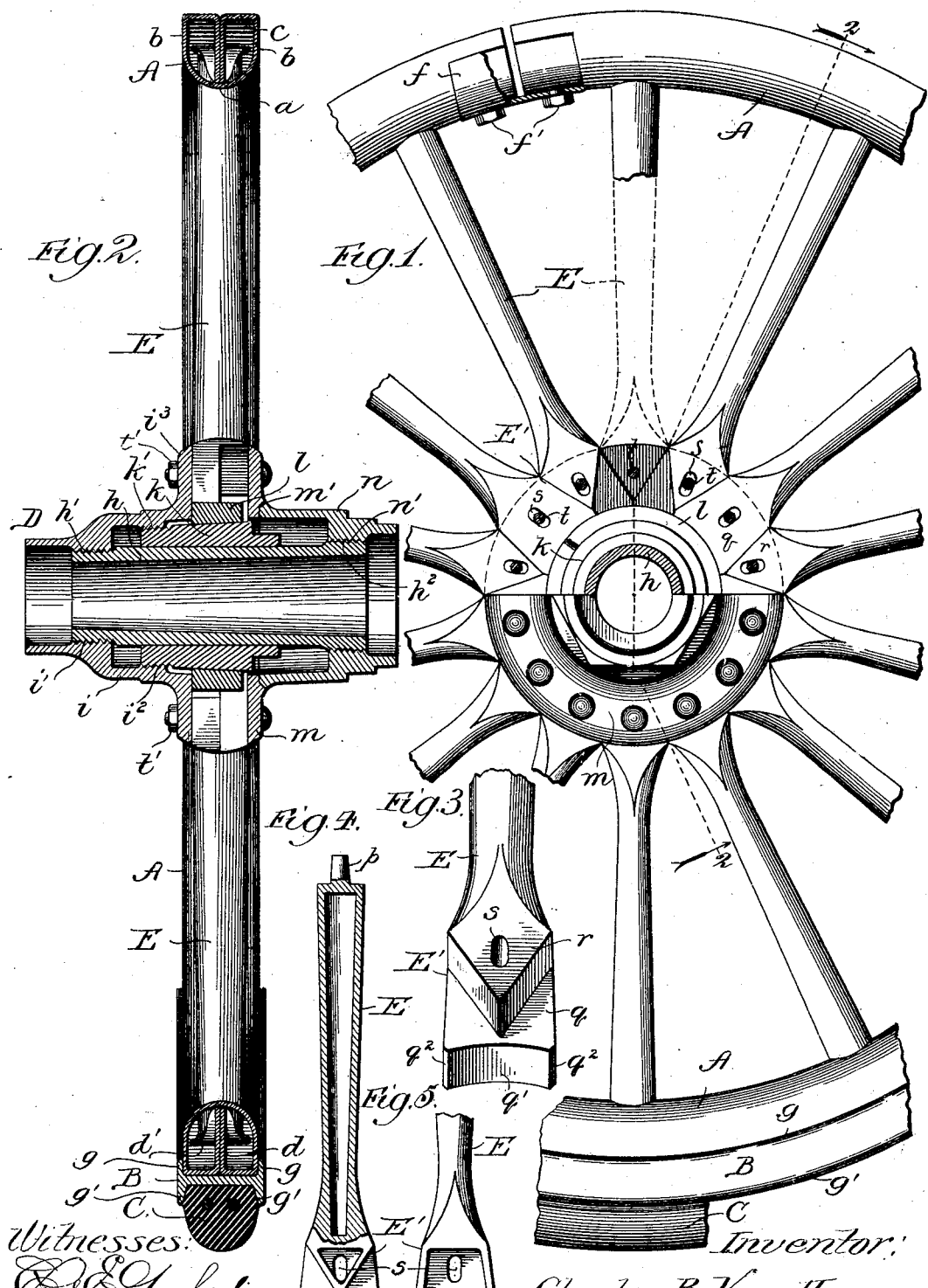

UNITED STATES PATENT OFFICE.

CHARLES B. VAN HORN, OF DETROIT, MICHIGAN.

VEHICLE-WHEEL.

SPECIFICATION forming part of Letters Patent No. 693,929, dated February 25, 1902.

Application filed February 9, 1900. Renewed July 29, 1901. Serial No. 70,180. (No model.)

*To all whom it may concern:*

Be it known that I, CHARLES B. VAN HORN, a citizen of the United States, residing at Detroit, in the county of Wayne and State of Michigan, have invented a new and useful Improvement in Vehicle-Wheels, of which the following is a specification.

My invention relates to improvements in wheels of the general class employing spokes, though more particularly to vehicle-wheels, and still more particularly to the class of vehicle-wheels which are provided with hubs formed of removable and replaceable sections, permitting the spokes to be taken out and inserted or tightened in place when desired without requiring the aid of a blacksmith or wheelwright.

My object is to provide a wheel with spokes of an improved construction adapting them to interlock and fit snugly together at the foot portions, thereby obviating the necessity of mortising the hub; further, to provide a wheel having an expansible hub with spokes constructed to interlock at the foot portions and form at the said foot portions a substantially continuous expansible center or ring around the axle-box, which when expanded tightens the spokes in the wheel-rim, and, still further, to provide a felly and spokes of constructions which will render the wheel particularly strong and durable and comparatively economical both in the matter of its manufacture and its use.

In the drawings, Figure 1 is a broken view of a wheel embodying my improvements, shown partly in elevation and partly in section, the uppermost spoke of the wheel being broken away and its position when in place indicated by dotted lines; Fig. 2, a section taken on the irregular line 2 2 of Fig. 1 and viewed in the direction of the arrow; Fig. 3, a broken and enlarged perspective view of the foot portion of a spoke, showing the preferred form when the spoke is constructed of wood; Fig. 4, a partly-sectional view of a hollow metal spoke, the foot and tenon being shown in elevation; Fig. 5, a broken elevation of the foot portion of the spoke illustrated in Fig. 4, but showing the opposite side thereof; Fig. 6, an enlarged broken section of the felly, rim, and tire at one of the spokes; Fig. 7, a section of the felly between spokes; Fig. 8, a section of the felly at the joint; Fig. 9, a broken plan section on line 9 of Fig. 8, and Fig. 10, a section of the felly provided with a solid-metal tire.

A is the felly of the wheel, formed of a strip of metal bent longitudinally and transversely to produce the rounded inner circumferential part $a$, flat sides $b\, b$, flat outer circumferential part $c$, and inward-extending flanges $d$. The spoke-sockets $e$ are openings in the part $a$, surrounded by inward-projecting cylindrical flanges, and at the sockets $e$ the flanges $d$ are bent to right angles to form bases $d'$ for the sockets $e$. Between the spoke-sockets the flanges $d$ extend to the inner surface of the part $a$ to brace the same. The ends of the felly are normally separated by a short space, and the end portions are depressed at the part $a$ and part way across the sides $b$ to form a socket $a'$, Fig. 8, to receive the U-shaped connecting-plate $f$. Brazed or otherwise secured in the end portions of the felly are lugs $d^2$, at which the felly presents threaded sockets $d^3$ to receive screws $f'$, which secure the plate $f$ in place. On the felly is a continuous rim B, having inward-projecting flanges $g$, fitting closely against the sides $b$. The rim may have outward-projecting flanges $g'$ to receive a rubber tire C, or the rim when in one piece may be thickened, as shown in Fig. 10, to itself form a solid-metal tire C'.

The hub D is formed of removable and replaceable members. At its center is an axle-box $h$, having screw-threads $h'$ and $h^2$ at opposite ends. Forming one end of the hub is a shell $i$, having the internal screw-thread $i'$, at which it is screwed upon the thread $h'$ of the box $h$, and an internal screw-thread $i^2$. Surrounding the box $h$ and sliding thereon is a tapering sleeve $k$, adapted to engage the inner circumference of a split expansion-ring $l$ and provided at its small end with a screw-thread $k'$ to engage the thread $i^2$ of the shell $i$. The spokes E at the ends of their foot portions are in contact with the expansion-ring $l$, and the shell $i$ is formed with an annular flange or plate $i^3$, which bears against one side of the spokes. By turning the sleeve $k$ to screw it into the shell $i$ its tapering surface bears against and expands the ring $l$ against the spokes to force them radially outward. On the side of the spokes opposite the shell $i$ is an annular plate $m$, having an annular socket $m'$, and $n$ is a shell having an internal screw-thread $n'$ to fit the thread $h^2$ of the box $h$. When screwed into place, the shell $n$ bears at its inner end in the socket $m'$ and presses the plate $m$ against the spokes to clamp them against the flange $i^3$.

The spokes E may be of wood or metal, and if of metal they are preferably hollow. Each spoke is provided at its outer end with a tenon $p$ and at its inner end with a foot E'. The foot E' is formed with a flaring part $q$ and a tapering somewhat shorter part $r$, each one-half the thickness of the foot. The end $q'$ of the part $q$ is concave in substantially the arc of the circle to be described by the said ends when the spokes are in place and is of a length to cause its corners $q^2$ to meet the adjacent corners $q^2$ of the second spoke therefrom on each side, so that the ends $q'$ of one-half the number of the spokes placed in the wheel fill out the circle. The relative angles of extent of the sides of the parts $q$ and $r$ are such that when two spokes, one to constitute the second spoke from the other in the series, are placed in position in the wheel the angle formed by the adjacent edges of the parts $q$ will coincide with the angle of the tapering sides of the part $r$, so that a spoke E placed between the said spokes to face with its part $r$ in the opposite direction will fit at its part $r$ into the angle formed by the adjacent edges of the parts $q$ of the spokes first placed in position and at its part $q$ into the angle formed by the adjacent edges of the parts $r$ of those spokes. Thus one set of spokes, composed of every second spoke in the wheel, faces with the parts $r$ thereof in one direction and the set of intervening spokes faces with its parts $r$ in the opposite direction. The corners $q^2$ of the parts $q$ of each set meet to form a substantially continuous circle, and the parts $q$ of one set dovetail into the parts $r$ of the other set, thus causing the spokes to interlock and fit snugly together at their foot portions.

In placing the spokes in the wheel they are passed at their tenons $p$ into the sockets $e$ of the felly and caused to interlock with each other at the foot portions, as described. The expansion-ring $l$, which is of springy metal and normally contracted, is then placed in position, after which the shell $i$ is placed against the ring at one side of the wheel and the sleeve $k$ passed from the opposite side of the wheel through the ring and screwed into the shell $i$. As the sleeve is screwed into place it opens and expands the ring $l$ against the inner ends of the spokes and forces the latter radially outward until they are firmly tightened in the felly A. The axle-box $h$, plate $m$, and shell $n$ are then placed in position, as described, and the wheel is intact. Should it become necessary at any time to replace one of the spokes with a new one, this may be readily and quickly done by removing the shell $n$ and plate $m$ and unscrewing the sleeve $k$ to cause the expansion-ring to contract and loosen the spokes. Should the wheel become "dished," it may be quickly repaired by loosening the spokes, as described, so that they may spring back into position and tighten them again. To further strengthen the wheel, the spokes may be provided at their foot portions with bolt-holes $s$ to register with coincident bolt-openings in the clamping-plates $i^3 m$, through which bolts $t$ may be passed and tightened in place by jam-nuts $t'$, as shown. I prefer to chamfer the corners $q^2$ of the spokes, as shown, to enlarge their meeting surfaces.

The spoke-tenon sockets $e$ are each provided, preferably, with a bushing or filling $e'$, of wood-fiber or other suitable and preferably non-resonant material, which fits the tenon closely. As where the spokes are to be employed in connection with expansible hubs the spokes should be able to move relatively a limited distance in the radial direction when loosened, and as it is desirable that the meeting surfaces of the parts $r$ $q$ shall produce close-fitting joints when the spokes are tightened the tenon of one of the spokes (or several, if desired) may be beveled off at one side $m$ and the shoulder at the opposite side of the tenon chamfered, as shown in Fig. 6, to permit the spoke to be swung laterally without material longitudinal movement a distance exceeding one-half the thickness of the spoke and operate thus as a key-spoke to be placed in position after the other spokes are tightened in place. The divided felly, with the ends separated, as described, may when the plate $f$ and spokes are removed be contracted for insertion into the rim B or tire C'.

In the metal spoke illustrated in Figs. 4 and 5 the faces of the parts $r$ and $q$ are provided with shallow recesses to save metal and reduce the weight of the spoke.

While I prefer to construct the various parts of the wheel as described, I do not wish to be limited to the exact forms shown, as they may be variously modified in the matter of details without departing from the spirit of my invention as defined by the claims.

What I claim as new, and desire to secure by Letters Patent, is—

1. In a wheel, spokes formed at their foot portions with flaring parts $q$ and tapering parts $r$, the parts $q$ overlapping each other at the sides of the parts $r$ when the spokes are in position, substantially as described.

2. In a wheel, spokes formed at their foot portions with flaring parts $q$ having chamfered corners and shorter tapering parts $r$, the parts $q$ overlapping each other and fitting at their edges against the tapering edges of the parts $r$ when the spokes are in position, substantially as described.

3. In a wheel, the combination with the felly, of spokes mutually overlapping and interlocking at their foot portions, and a hub formed of expansible sections operative to expand and tighten the spokes in the felly and clamp the foot portions in their interlocked condition, substantially as described.

4. In a wheel, the combination with the felly, of removable and replaceable spokes mutually overlapping and interlocking at their foot portions, and a hub provided with an expansion-ring, means for expanding the ring against the ends of the spokes, and clamping-plates engaging the opposite sides of their foot portions, substantially as described.

5. In a wheel, the combination with the felly, of spokes mutually overlapping and interlocking at their foot portions and provided with transverse bolt-openings, a hub provided with clamping-plates, for the said foot portions, and bolts passing through the said clamping-plates and openings in the foot portions, substantially as described.

6. In a wheel, the combination with the felly of removable and replaceable spokes provided with tenons engaging sockets in the felly, and mutually interlocking at their foot portions, one of said spokes being adapted to swing laterally, with its tenon in a felly-socket, a limited distance without longitudinal movement, and a hub formed in sections and clamping the spokes in their interlocked condition, substantially as and for the purpose set forth.

7. A wheel provided with hollow metal spokes having integral mutually interlocking and overlapping foot portions, substantially as described.

8. In a wheel, the combination of a hub formed with expansible sections, a hollow metal felly, hollow spokes having integral mutually interlocking and overlapping foot portions, means on the hub for expanding the hub to tighten the spokes against the felly, and means on the hub for clamping the spokes in their interlocked condition, substantially as described.

9. In a wheel, the felly A, formed of metal bent to produce an annular tubular structure having the internal transverse bracing-flange $d$, substantially as described.

10. In a wheel, the felly A, formed of metal bent to produce an annular tubular structure having the internal transverse bracing-flange $d$ and provided with spoke-tenon sockets, substantially as described.

11. In a wheel, the felly A formed of metal provided with cylindrical spoke-tenon sockets, and bent to produce an annular tubular structure having the internal transverse bracing-flange $d$ and flanges $d'$ across the braces of the sockets, substantially as described.

12. In a wheel, the felly A, formed of metal provided with cylindrical spoke-tenon sockets, and bent to produce an annular tubular structure having the internal transverse bracing-flange $d$, and bushings in the said sockets, substantially as described.

13. In a wheel, the felly A, formed of metal bent to produce an annular tubular structure having the flat outer circumferential part $c$ and flat sides $b$, and a rim fitting around the part $c$ and having flanges $g$ embracing the sides $b$, substantially as described.

CHARLES B. VAN HORN.

In presence of—
J. W. DYRENFORTH,
ALBERT BACCI.